Aug. 14, 1934.  H. W. ALLISON ET AL  1,970,160
AUXILIARY BRAKE AND ACCELERATOR CONTROL
Filed Dec. 27, 1932   2 Sheets-Sheet 1
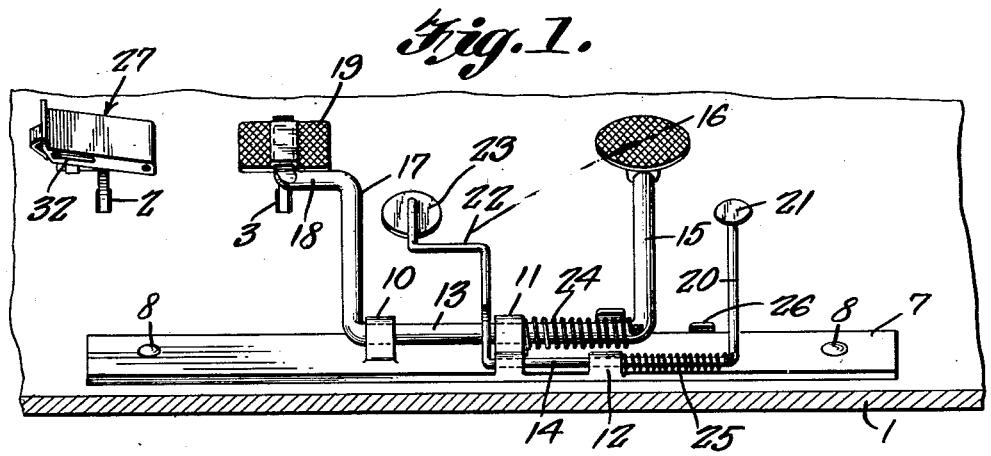
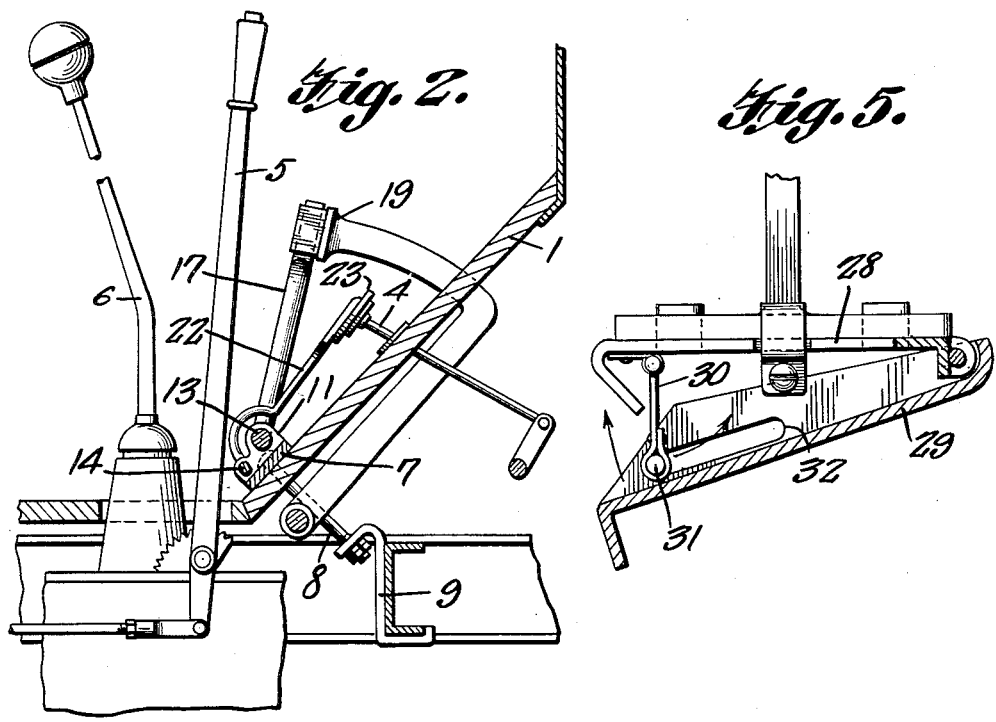
Stanley M. Crumb,
Howard W. Allison,
INVENTORS

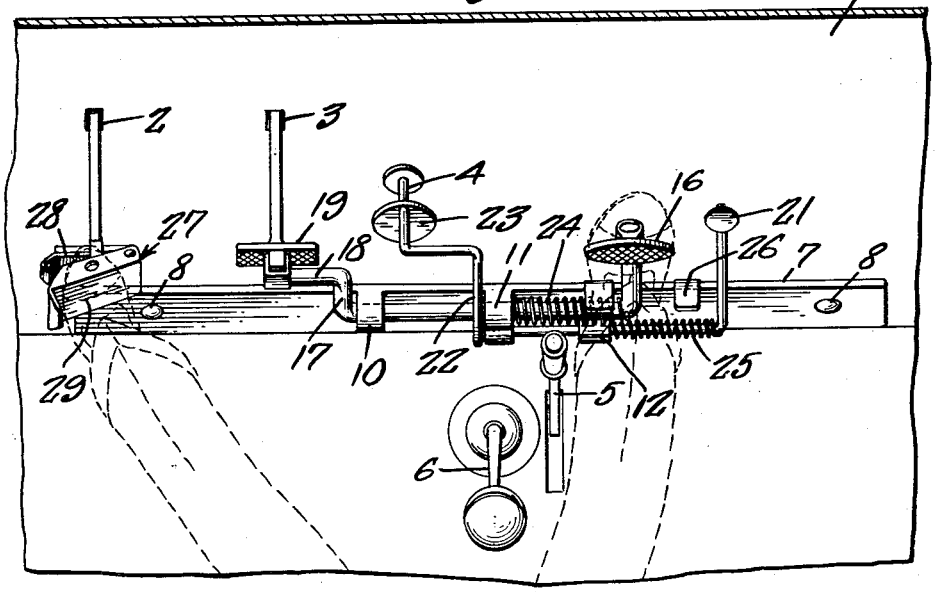
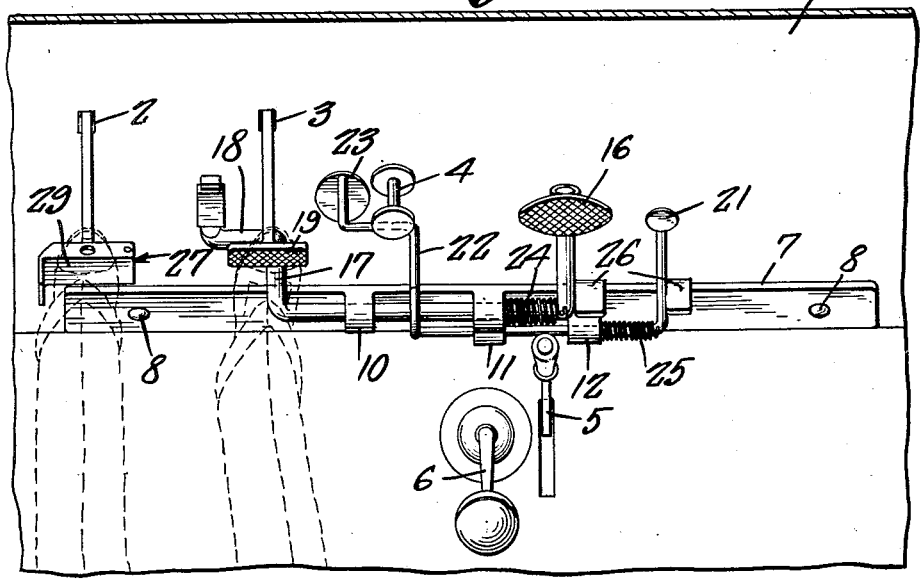

Patented Aug. 14, 1934

1,970,160

UNITED STATES PATENT OFFICE 1,970,160

AUXILIARY BRAKE AND ACCELERATOR CONTROL

Howard W. Allison and Stanley M. Crumb, Delaware, Ohio

Application December 27, 1932, Serial No. 649,030

4 Claims. (Cl. 192—.01)

This invention relates to a brake and accelerator control for automobiles and like vehicles and is especially adapted to facilitate deliveries to be made by the driver from either side of the automobile without the driver moving from a seated position and has for the primary object, the provision of a device of the above stated character which may be easily and quickly installed on any automobile, whereby the driver may from a seated position midway between the ends of the driver's seat conveniently actuate the clutch and brake pedal and also the acelerator, thereby permitting the driver to occupy a position in the automobile to make delivery at either side of the automobile without moving from a seated position which saves time and physical effort as well as reducing wear on the driver's clothes and the seat of the automobile to a minimum.

With these and other objects in view this invention consists in certain novel features of construction, combination and arrangement of parts to be hereinafter more fully described and claimed.

For a complete understanding of our invention, reference is to be had to the following description and accompanying drawings, in which Figure 1 is a front elevation partly in section illustrating an auxiliary brake and accelerator control applied to the floor board of an automobile.

Figure 2 is a vertical sectional view illustrating the same.

Figure 3 is a top plan view partly in section illustrating the position occupied by the driver when utilizing the control.

Figure 4 is a similar view showing the normal position of the driver and the auxiliary control rendered inoperative.

Figure 5 is a fragmentary plan view, partly in section, illustrating an attachment for the clutch pedal.

Referring in detail to the drawings, the numeral 1 indicates a floor board of an automobile having extending therethrough clutch and brake pedals 2 and 3, accelerator pedal 4, emergency brake lever 5 and gear control lever 6. These parts are located in a normal position so that the driver of the automobile sits at the left hand side of the driver's seat. Therefore, the driver may only from a seated position make deliveries conveniently from the left hand side of the automobile and in order to make a delivery from the right hand side of the automobile it is necessary that the driver move from a sitting position towards the right of the automobile and such practice places considerable wear on the clothing of the driver and also the seat of the automobile and further requires an expenditure of considerable physical effort and to overcome these disadvantages and to save time in the making of deliveries our invention is employed and consists of a supporting strip 7 mounted on the floor board 1 by bolts 8 extending through the floor board and connected to clamps 9 engageable with the frame of the automobile. Formed integrally with the supporting strip 7 are bearings or journals 10, 11 and 12. The journal or bearing 11 is of the double type capable of supporting rods 13 and 14 both for rotary and sliding movement. The rod 13 is also supported by the bearing or journal 10 and the rod 14 is also supported by the bearing or journal 12. An arm 15 is formed integrally with one end of the rod 13 and extends at right angles thereto and carries a foot pedal 16 positioned to the right of the emergency brake lever 5 and the gear control lever 6. An arm 17 is formed integrally with the other end of the rod 13 and extends at right angles thereto and is provided with an angularly related portion 18 overlying the tread portion 19 of the brake pedal so that when pressure is placed on the pedal 16 the brake pedal will be depressed to cause application of the brakes of the automobile.

The rod 14 has formed integrally with one end an arm 20 arranged to the right of the arm 15 and carrying a foot pedal 21. An arm 22 is formed integrally with the rod 14 and extends at right angles thereto and is provided with an angularly related portion carrying a plate 23 in engagement with the accelerator pedal 4 so that when pressure is applied to the foot pedal 21 the accelerator will be depressed for the purpose of increasing the supply of fuel to the engine of the automobile.

Coil springs 24 and 25 are mounted on the rods 13 and 14 and one end of each spring is secured to its respective rod while its opposite end engages one of the bearings or journals. The purpose of the springs is to urge the rods in one direction and in a direction to maintain the portion 18 and plate 23 in engagement with the brake pedal and accelerator. The springs also permit the rods to be slid endwise and towards the left of the automobile for the purpose of disengaging the portion 18 and plate 23 from the brake pedal and the accelerator and when freed therefrom the springs force said plates to engage the floor board 1 and thereby position the auxiliary control at an inoperative position, leaving the brake pedal and accelerator free for normal manipulation by the driver when occupying a seated position at the left of the automobile. When the auxiliary control is positioned in an inoperative position, the arms 15 and 20 frictionally engage stops 26 on the supporting plate to aid in retaining the control in the inoperative position.

A pedal extension 27 is provided for the clutch pedal 2 and consists of a plate 28 detachably secured to the clutch pedal and has hinged thereto a treadle plate 29. The treadle plate 29 overlies the plate 28 and may be positioned at an inclination thereto, as shown in Figures 5 and 3 by an adjustable racket 30 so that when the driver occupies a central position, as shown in Figure 3, the treadle plate is positioned at a convenient angle so that the left leg and foot of the driver may depress or actuate the clutch pedal. The bracket 30 is hinged to the plate 28 and carries a pin 31 operating in a slot 32 of the treadle plate 29 and preferably having frictional contact with the walls of the slots so as to maintain the bracket in any of its adjusted positions. By swinging the bracket 30 in one direction the treadle plate 29 may move into substantial parallelism with the clutch pedal so that the latter may be conveniently operated by the driver when seated at the left of the automobile driver's seat.

In operation, when a driver desires to make deliveries from either side of the automobile the auxiliary control is placed in operation and as shown in Figure 3 the legs of the driver straddle the emergency brake control lever and the gear control lever 6, thereby placing the right foot in a position to engage either the pedal 16 or 21 while the left foot engages the treadle plate 29 of the clutch pedal extension 27. The driver when in this position has complete control of the automobile and also may conveniently make deliveries at either side of the automobile.

A device of the heretofore described character is especially desirable for use on automobiles employed for making deliveries, such as mail trucks and other merchandise delivery trucks.

While we have shown and described the preferred embodiment of the invention, it will be understood that minor changes in construction, combination and arrangement of parts may be made without departing from the spirit and scope of our invention, as claimed.

Having described the invention, we claim:

1. In combination with an automobile having clutch and brake pedals and an accelerator located at one side of the driver's compartment of the automobile, a foldable extension on the clutch pedal to be engaged by one foot of a driver when seated centrally of the driver's compartment, a supporting element carried by the automobile, rods journaled to said supporting element, means carried by said rods to engage the brake pedal and accelerator, and means on said rods to be engaged by the other foot of the driver for causing actuation of the brake pedal and accelerator.

2. In combination with an automobile having clutch and brake pedals and an accelerator located at one side of the driver's compartment of the automobile, a foldable extension on the clutch pedal to be engaged by one foot of a driver when seated centrally of the driver's compartment, a supporting element carried by the automobile, rods journaled to said supporting element, means carried by said rods to engage the brake pedal and accelerator, arms on said rods, and pedals carried by said arms to be engaged by the other foot of the driver.

3. In combination with an automobile having clutch and brake pedals and an accelerator located at one side of the driver's compartment of the automobile, a foldable extension on the clutch pedal to be engaged by one foot of a driver when seated centrally of the driver's compartment, a supporting element carried by the automobile, rods journaled to said supporting element, means carried by said rods to engage the brake pedal and accelerator, arms on said rods, and pedals carried by said arms to be engaged by the other foot of the driver, tension means connected to said rods for urging the first-named means into engagement with the brake pedal and accelerator.

4. In combination with an automobile having clutch and brake pedals and an accelerator located at one side of the driver's compartment of the automobile, an extension on the clutch pedal to be engaged by one foot of a driver when seated centrally of the driver's compartment, a supporting element secured to the automobile, rods rotatably and slidably mounted on the element, arms carried by said rods to engage the brake pedal and accelerator, pedals carried by said rods to be engaged by the other foot of the driver, and coil springs for urging the rods in one direction to cause the arms to engage the brake pedal and accelerator and to engage with the floor boards of the automobile when said arms are shifted laterally of the brake pedal and accelerator.

HOWARD W. ALLISON.
STANLEY M. CRUMB.